Figures 1, 2:
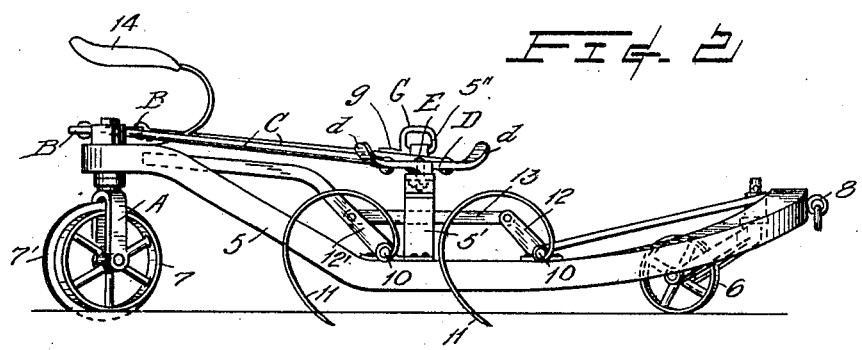

No. 878,375.

PATENTED FEB. 4, 1908.

C. W. GIBBS.
CULTIVATOR.
APPLICATION FILED FEB. 18, 1907.

WITNESSES:
G. W. Slater
F. K. Steer

INVENTOR
Charles W. Gibbs
BY
Pierre Barnes
ATTORNEY

UNITED STATES PATENT OFFICE.

CHARLES W. GIBBS, OF PESHASTIN, WASHINGTON.

CULTIVATOR.

No. 878,375.　　　　Specification of Letters Patent.　　　　Patented Feb. 4, 1908.

Application filed February 18, 1907. Serial No. 357,902.

To all whom it may concern:

Be it known that I, CHARLES W. GIBBS, a citizen of the United States, residing at Peshastin, in the county of Chelan and State of Washington, have invented certain new and useful Improvements in Cultivators, of which the following is a specification, reference being had therein to the accompanying drawings.
This invention relates to agricultural machines and of that class commonly known as cultivators, such as, for example, harrows, horse-hoes and sulky-plows which are employed in preparing the ground for the reception of crops or tending the same while the crop is growing.

In cultivating orchard land great difficulty is experienced in tilling the ground between the rows of trees and which hitherto has been attained by first operating the cultivators in parallels between the tree-rows and thence by transverse operations attack the remaining intervening balks. Even by such practices the cultivators drawn by horses commonly in use are unfitted for operating close to the tree trunks inasmuch as the lower branches of the trees interfere with the near approach thereto of the draft animals and consequently the cultivators following at quite a distance from the trees leave relatively large spaces which have to be cultivated by manual labor, or left untilled and abandoned to weeds.

It is the object of my invention to overcome the above mentioned difficulties by the provision of devices under the control of the driver whereby the cultivator may be predeterminately swerved to one side or the other independently of the horses and thus be made to operate in close proximity of the individual trees as well as to swing into the spaces therebetween and leave no balks whatsoever, and that without the necessity of transverse cultivation, though the latter may be utilized where the ground is to be further pulverized.

With the foregoing and other objects in view the invention consists in the novel construction, adaptation and combination of parts as will be hereinafter described and claimed.

In said drawings, Figure 1 is a plan view of a harrow-cultivator embodying my improvements; and Fig. 2, a side elevation of the same.
The reference numeral 5 represents the frame of a cultivator which is supported at the front by a caster wheel 6 and by two wheels 7, at the rear. At the front end is provided means, as with an eye-bolt 8, whereby the single- or double- trees of a team for drawing the cultivator, are attached. Journaled in bearings 9 of the frame are transversely arranged shafts 10 carrying harrow-teeth 11.
12, 12' are arms fixedly secured to the respective shafts and are connected by a link 13 whereby they will swing in unison for lowering the points of said teeth when they are to be operated or raising the same clear of the ground when unoccupied. This can be accomplished in various ways as by prolonging one of the arms, as 12', to within the reach of the driver for whom is provided a sulky-seat 14.
All of the aforedescribed elements of the machine are, or may be, as common and, in themselves, form no part of the present invention which I will now proceed to describe.

According to my invention I mount the wheels 7 in forked upright posts A which extend through journal bearings provided in said frame. The wheels, for the proper carrying out of the objects sought, are preferably formed with peripheral flanges 7'.
Connected with the respective posts in a rigid manner are arms B which are respectively connected by drag-bars C with the oppositely directed arms of a lever D positioned at such a distance in front of the seat as to be operated by the feet of the driver. This lever is fulcrumed, intermediate its connections with the bars C, by a pivotal bolt E seated in a bridge-member 5', or its equivalent, of the frame. To afford a better step for the driver's feet said lever has its extremities d turned upwardly. G is a link which is hinged to a socket 5'' at one end of said bridge-member and is adapted to be engaged over the adjacent extremity of the lever and secure the same in its mid-position, that is, at right angles to the longitudinal axis of the frame, or can be tilted back with the toe of the driver's shoe to allow of the lever being freely swerved in one direction or the other. To facilitate the disengagement of the link from the lever the former is desirably provided with a wing g which is always within easy reach of the driver's foot.

The operation of the invention may be described as follows: When the cultivator is to be hauled directly in line with the travel of the draft animals the lever D is maintained in its mid-position either by being engaged with the link G or by pressure exerted by the feet of the operator equally upon both of the lever arms. When, however, the cultivator is to be diverted to one side or the other foot pressure is exerted upon the lever-arm which will swerve the lever to rotate, through the medium of the bars C and arms B, the wheels 7 to such an obliquity as to direct the cultivator in a lateral direction during the progressive movement of the same. When the cultivator has been thus moved toward the side it may thereupon be controlled to move in a path parallel to that taken by the team by returning the wheels, through the manipulation of the lever, to be straight with the frame, or corresponding with that had by wheels in ordinary vehicles.

The invention is extremely trustworthy in its action and will not only serve for the purposes before alluded to, but likewise makes it possible to turn sharp corners.

To accommodate the invention to various constructions of frame, etc., changes may be made from the construction and arrangement of the various parts illustrated and described, without sacrificing its advantages or departing from the essence of the same.

Having described my invention, what I claim as new and desire to secure by Letters-Patent, is,—

1. A cultivator embodying a frame formed with sides which are depressed central of their length, posts extending vertically through the rear end of said frame, a wheel rotatably secured to each post, a transverse bridge member secured at its ends to the depressed parts of the frame sides and having its central portion in approximately the same horizontal plane as the rear end of the frame, an operating lever pivoted to the central part of said bridge member, and connections between said operating lever and said bridge.

2. In a cultivator, a pair of wheels turnable in a horizontal rotary plane, an operating lever for actuating said wheels, a pivoted open link formed to receive an end of said lever, and a projecting part from said link for engagement with and operable by the foot of the operator.

3. A cultivator embodying a frame, wheel-carrying posts rotatably mounted on the frame, a transverse bridge member secured by its ends to the sides of said frame, an operating lever pivoted to the top face of said bridge member central of the length of the latter, a radial arm carried by each post, and bars connected to said arms and to said lever, said lever at its ends being curved to form foot engaging parts, and means to lock said lever to said frame.

4. A cultivator embodying a frame, wheel-carrying posts rotatably mounted on the frame, a centrally arched transverse bridge member secured to said frame, an arm carried by each post, an operating lever pivoted to the upper face of said bridge member, connections between said lever and said arms, and means on the bridge member for locking said lever against movement.

In testimony whereof I affix my signature in presence of two witnesses.

CHARLES W. GIBBS.

Witnesses:
PIERRE BARNES,
G. W. SLATER.